(No Model.)

J. J. VALENTINE.
SHAFT COUPLING.

No. 432,916. Patented July 22, 1890.

Witnesses
Samuel Ker
N. L. Collamer

Inventor
Joseph J. Valentine.
By his Attorneys
C. A. Snow & Co.

UNITED STATES PATENT OFFICE.

JOSEPH J. VALENTINE, OF PHILADELPHIA, PENNSYLVANIA.

SHAFT-COUPLING.

SPECIFICATION forming part of Letters Patent No. 432,916, dated July 22, 1890.

Application filed March 22, 1890. Serial No. 344,931. (No model.)

*To all whom it may concern:*

Be it known that I, JOSEPH J. VALENTINE, a citizen of the United States, residing at Philadelphia, in the county of Philadelphia and State of Pennsylvania, have invented a new and useful Shaft-Coupling, of which the following is a specification.

This invention relates to shafts for machinery, and more especially to the couplings between the ends thereof. The object of the invention is to provide a device which will firmly and rigidly clamp the adjacent ends of two shafts in true axial alignment, and which will prevent the turning or even partial turning of one shaft with respect to the other when the ends are so clamped. This object I accomplish by my shaft-coupling, which consists, essentially, of the well-known sleeve having a tapered hole through its center, a tapered split bushing seated in said hole and having its smaller end threaded, a nut on said threaded end, and a spline-and-groove connection between said bushing and the adjacent ends of the aligned shafts, together with certain novel adjunctive and specific details and auxiliaries—such as the means for preventing the unscrewing of said nut—which assist in carrying out said object, all as hereinafter more fully described, and illustrated in the accompanying drawings, in which—

Figure 1:
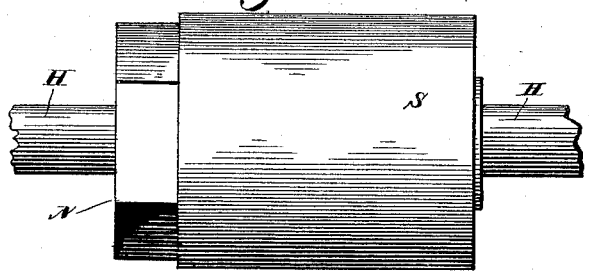
Figure 2:
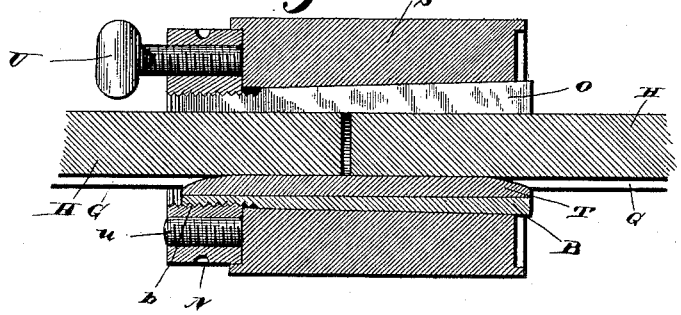
Figure 3:
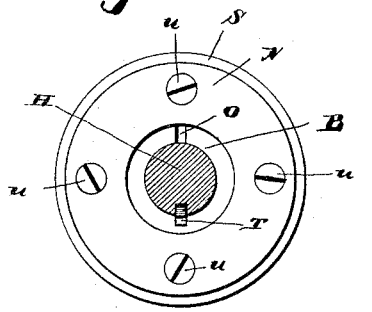
Figure 4:
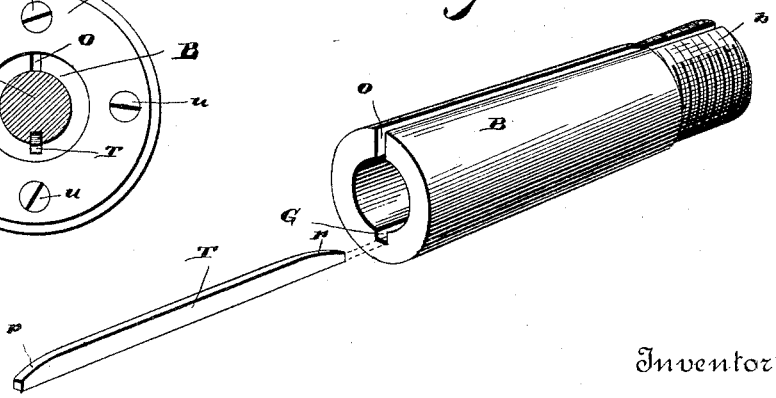

Figure 1 is a side elevation of my improved shaft-coupling complete. Fig 2 is a central vertical longitudinal section of the same. Fig. 3 is an end view. Fig. 4 is a detail perspective view of the bushing and its spline.

Referring to the accompanying drawings, the letter S designates a metallic sleeve or tube whose outer face is cylindrical, but whose bore or inner face tapers from one end to the other. Within this bore is removably inserted the metallic bushing B, whose outer face is tapered to correspond with the bore, but whose inner face is cylindrical and of a size to receive the ends of the shafts which are to be coupled or connected, and the smaller end of this bushing is threaded, as shown at $b$.

The letter H designates shafting of the usual construction, except that the ends of the shafts which are to be coupled, as well as the interior of the hole through the bushing, are provided with grooves G of a size to receive the spline or tongue T, as will be understood. This spline is rectangular in cross-section and is of the same length as the bushing B. It is normally seated in the groove within the bushing, above which it projects slightly, and its ends are rounded, as shown at $p$, to facilitate their entrance into the grooves G in the sides of the shafts. The latter are thus prevented from turning within the bushing, and hence from turning with respect to each other. The ends of the shafts having been inserted and locked in the bushing in the manner above described, it becomes desirable to provide means for preventing the bushing from sliding longitudinally upon the spline. With this end in view I cut a longitudinal slot O completely through the body of the bushing B along one side, and preferably at a point about opposite the groove G. The shafts being secured within the bushing, the latter is forced into the tapered bore within the sleeve S, whereby the sides of the bushing are drawn toward each other and its body firmly clamped around and upon the ends of the shafts. A nut N is provided which has angular faces, as shown in Fig. 1, or may have holes for the reception of a spanner, as shown in Fig. 2, and this nut engages the thread $b$ of the bushing and bears against the end of the sleeve S to draw the bushing forcibly into the same, as will be understood.

The letter U designates a thumb-screw, which passes through the nut N and bears upon the end of the sleeve, and by this means the nut is held against retraction after it has been tightened, and the tension on the bushing which holds it firmly in its tapered seat is therefore not relaxed. After the nut N is turned up tightly the thumb-screw U is turned in, and a set-screw $u$ is inserted in another similar hole at the opposite side of the axial point and bears against the end of the sleeve in the same manner as the thumb-screw. The latter is then removed and another set-screw $u$ is substituted in its place, the object being that no projecting heads shall disfigure the nut and that no unauthorized person, by simply loosening a thumb-screw, can uncouple the shafts.

It will thus be seen that the shafts are coupled by a spline-and-groove connection; that a bushing tightly surrounds these shafts and their coupling; that a sleeve having a tapered bore is wedged upon the outer face of the bushing; that a nut engages the smaller end of the bushing and bears against one end of the sleeve, and that screws pass through this nut and abut against the end of the sleeve to prevent the unscrewing of the nut and the consequent dislocation of the parts.

This improved shaft-coupling affords a very reliable means of connecting the ends of revolving shafts and possesses the especial advantage, on account of the long taper of the bushing and of the bore in the sleeve, that the two shafts are firmly and rigidly clamped within the bushing in exact axial alignment in addition to the coupling devices, by means of which they are caused to rotate in unison. This clamping action of the bushing occurs throughout its whole length simultaneously and is produced by the simple turning of a single nut, as above described. My improved shaft-coupling, therefore, possesses the advantage of great simplicity, as well as of completeness in its mechanical structure and the effect thereof.

What I claim is—

In a shaft-coupling, the combination, with a split bushing and spline-and-groove connections between the interior of this bushing and the exterior of the shafts being coupled, said bushing having a tapered outer face and an externally screw-threaded smaller end, of a sleeve having a tapered bore fitting upon said outer face, a nut upon said threaded end of the bushing bearing against the end of the sleeve, and screws passing through said nut and abutting against the end of the sleeve, substantially as and for the purpose set forth.

In testimony that I claim the foregoing as my own I have hereto affixed my signature in presence of two witnesses.

JOSEPH J. VALENTINE.

Witnesses:
WILLIAM F. DOWD,
JOHN P. CARNEY.